United States Patent [19]
Joson

[11] Patent Number: 5,626,969
[45] Date of Patent: May 6, 1997

[54] METHOD OF MANUFACTURING FILM FOR LAMINATION

[75] Inventor: Luis Joson, Lincolnwood, Ill.

[73] Assignee: General Binding Corporation, Addison, Ill.

[21] Appl. No.: 128,062

[22] Filed: Sep. 27, 1993

Related U.S. Application Data

[63] Continuation of Ser. No. 838,915, Feb. 21, 1992, abandoned.

[51] Int. Cl.$^6$ .................................................. B32B 27/08
[52] U.S. Cl. .................................... 428/474.4; 428/474.9; 428/475.5; 428/478.8; 428/479.3; 428/212; 428/535; 428/536; 156/192; 156/499
[58] Field of Search .......................... 428/474.4, 474.9, 428/475.5, 478.8, 479.3, 212, 535, 536; 156/499, 192

[56] References Cited

U.S. PATENT DOCUMENTS

| | | | |
|---|---|---|---|
| T949,005 | 8/1976 | Coney et al. | |
| 2,129,929 | 9/1938 | Gurwick | 156/192 |
| 2,188,331 | 7/1940 | Coggeshall | 428/478.8 |
| 2,188,332 | 7/1940 | Carothers | 428/332 |
| 2,416,041 | 10/1947 | Austin | 428/262 |
| 2,511,783 | 6/1950 | Newman | 101/460 |
| 2,610,927 | 9/1952 | Foulds | 428/264 |
| 2,630,397 | 3/1953 | Cowan | 428/479.6 |
| 2,635,970 | 4/1953 | Salo et al. | 428/535 |
| 2,635,972 | 4/1953 | Azorlosa et al. | 428/535 |
| 2,962,382 | 11/1960 | Ives | 346/135.1 |
| 3,065,120 | 11/1962 | Avelar | 428/454 |
| 3,259,537 | 7/1966 | Battista | 428/393 |
| 3,616,176 | 10/1971 | Jachimowicz | 428/200 |
| 3,824,116 | 7/1974 | Anderson et al. | 430/270.1 |
| 4,064,302 | 12/1977 | Kozlowski et al. | 428/152 |
| 4,394,416 | 7/1983 | Shimizu et al. | 428/341 |
| 4,960,484 | 10/1990 | King et al. | 156/499 |
| 4,977,136 | 12/1990 | Fujiwara et al. | 503/227 |

FOREIGN PATENT DOCUMENTS

| | | | |
|---|---|---|---|
| 49-24801 | 6/1949 | Japan | 428/475.5 |
| 61-102486 | 5/1986 | Japan | 428/479.5 |
| 2195313 | 4/1988 | United Kingdom. | |

Primary Examiner—Leszek Kiliman
Attorney, Agent, or Firm—Hill, Steadman & Simpson

[57] ABSTRACT

A method of one sided laminating and a one sided laminated product using nylon laminating film reduces the tendency of one-sided laminations to curl toward the laminating side due to moisture swelling of the paper side of the lamination.

14 Claims, 2 Drawing Sheets

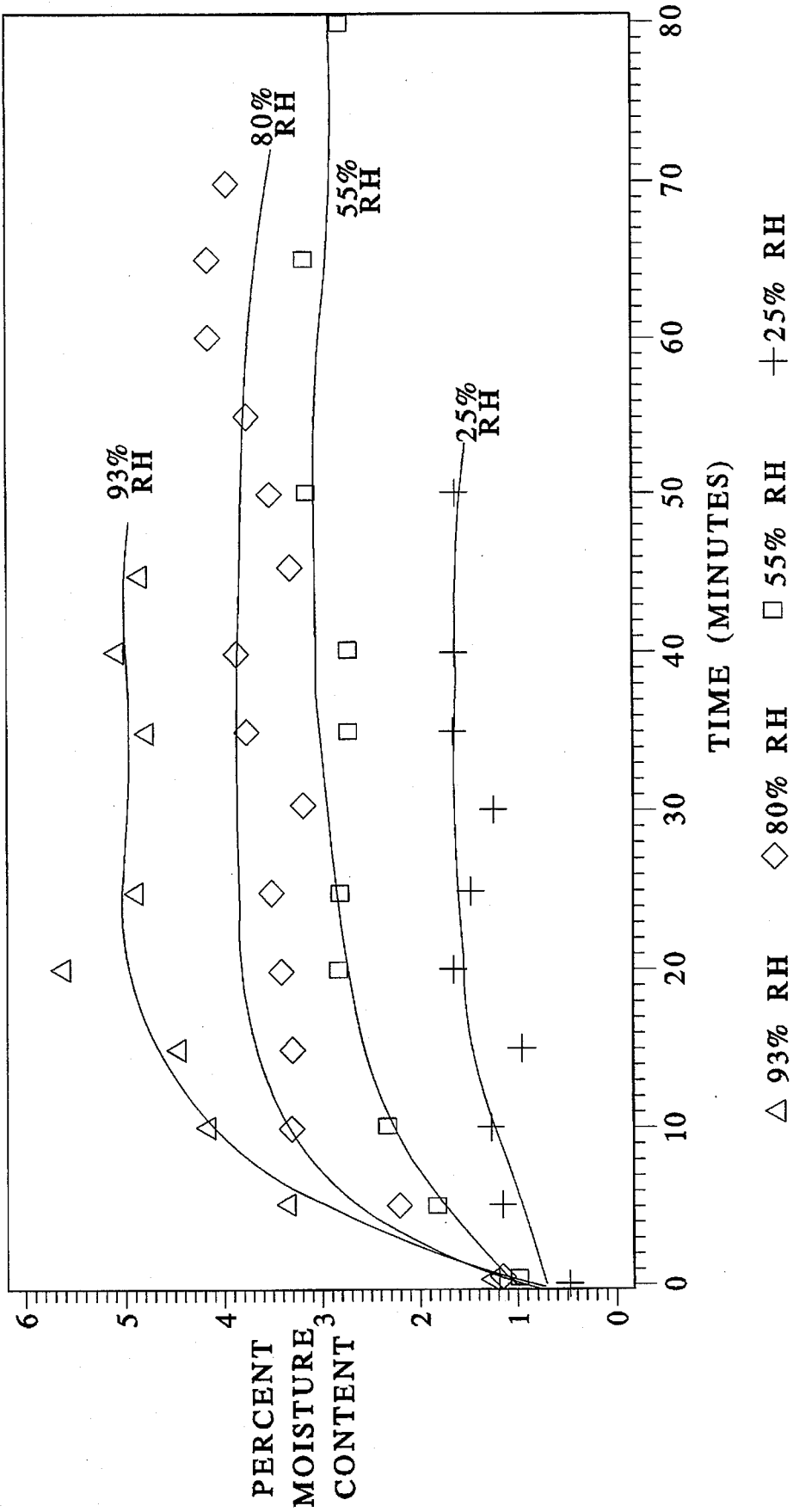

METHOD OF MANUFACTURING FILM FOR LAMINATION

This is a continuation, of application Ser. No. 07/838,915, filed Feb. 21, 1992, now abandoned.

BACKGROUND OF THE INVENTION

This invention relates to laminating methods and particularly to a method for use in one-sided or single-sided lamination and resultant product thereof.

In many applications it is desireable to heat laminate a plastic-like protector film to an unprotected underlying sheet for protecting the text material, etc., on the underlying sheet. The sheet and film is subsequently cut into individual pages, covers, etc. However, problems arise in one sided laminations.

Paper is a hygroscopic substance, it picks up excess moisture from the surrounding atmosphere quickly. It's moisture content depends upon the relative humidity and the temperature of the air it is in contact with. An important consequence of the desorption and absorption of water by paper is the change in dimension that usually accompanies changes in moisture content. Dimensional changes in paper originate in the swelling and contraction of the individual paper fibers. It is common for paper to show dimensional changes, up to 1% in the cross direction and corresponding changes in the machine direction could range up to 5%.

Paper used for cover stock for books and magazine covers are typically laminated, and one process of lamination is thermal. The thermal laminating film used usually consists of one layer of polyethylene or copolymer of polyethylene and oriented polypropylene or polyester.

One sided thermal lamination of paper using polypropylene or polyester has some inherent drawbacks. For stock with only one side laminated, moisture is now only absorbed by the paper on one side because of the protection of the laminate film. This increases the dimension of the paper and causes the laminated paper to curl towards the film side or laminated side.

A "perfect" bound book is one in which a layer of adhesive holds the pages and cover together. The problem on typical perfect bound books, depending on the relative humidity of the atmosphere and type of cover stock, can be a slight curl on the cover, i.e., the cover rolls like a scroll.

The protector film can be applied to both sides of the underlying or unprotected product in order to protect text on both sides of the product and to prevent paper moisture growth on any one side compared with the lack of moisture growth of the protector film on the other side. In other words, by laminating on both sides, the various forces are balanced or offset and the resulting web (i.e., product and film) is substantially planar or flat.

However, in most applications it is necessary to protect one side of a product and only one protector film need be laminated to the product. A successful one side lamination is thus desireable.

SUMMARY OF THE INVENTION

The present invention provides a method for manufacturing a film suitable for use in thermal one side lamination which eliminates the inherent tendency of perfect bound books, soft cover books and other laminating films of polyester and polypropylene to curl. Specifically, in accordance with the invention, nylon is used as the base film because nylon has the property of absorbing moisture with a resultant increase in dimensions similar to paper. This absorption of moisture by nylon makes the film compensate for the moisture absorption of paper by more than one phenomena. When the moisture is absorbed by nylon, not only does the dimension increase, but the film moisture absorption acts like a plasticizer, causing an increase in elongation and a decrease in tensile strength. The film is made softer so that it can elongate with the paper with less force because of a decrease in tensile strength, making the laminated book cover remain flat.

As background information, Table 1, from Britt Pulp and Paper Technology 2d Ed. Chapter 9-2, shows the moisture content values of three different types of paper at several relative humidities. FIG. 1 shows the typical moisture sorption isotherms for pulp and paper. These figures show the moisture contents of paper products ranging from approximately 2% through 10% at typical room temperature and humidities.

TABLE 1

| Temperature 73° | Moisture Content (%) | | |
| --- | --- | --- | --- |
| | 100% Rag | Bleached Sulfite | Ground-wood |
| 52.4% RH desorption | | 8.37 | |
| 52.6% RH desorption | 5.86 | | |
| 52.4% RH adsorption | | 7.88 | |
| 48.0% RH desorption | | 7.89 | |
| 48.0% RH adsorption | | 7.62 | |
| 50.0% RH adsorption | | | 9.70 |

BRIEF DESCRIPTION OF THE DRAWINGS

FIG. 2 is a graph of the moisture content of Nylon 6 biaxially oriented.

DETAILED DESCRIPTION OF THE PREFERRED EMBODIMENT

Figure 1:
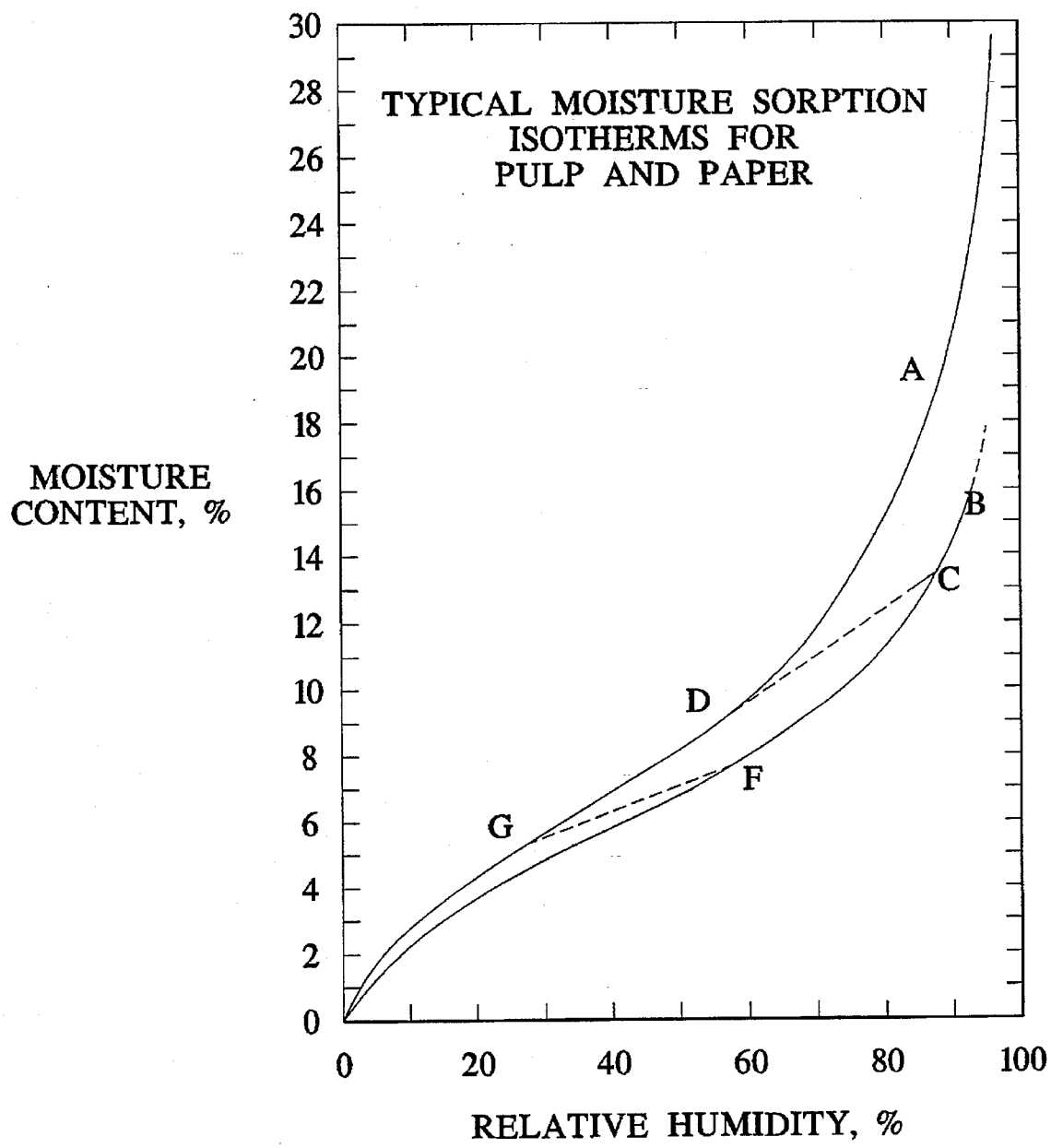
FIG. 1 is a graph of the moisture content for paper products.

Thermal lamination is the process of combining a heated web to second webs or sheets. The process uses dry non-tacky film until it is heated. The combining station is typically comprised of two rollers. One of the rollers is steel internally heated and having a polished surface. The other is a rubber covered impression roller.

A typical single-sided laminator apparatus is disclosed in U.S. Pat. No. 4,960,484, wherein a reverse curling is attempted to offset curling.

FIG. 1, from Britt Pulp and Paper Technology, Chapters 9-2, show moisture sorption isotherms for a typical paper formed from relatively pure cellulosic fibers. The desorption of cellulose that has never been dried is shown in curve A. The corresponding adsorption is shown on curve B. Partial absorption to a relative humidity corresponding to point C, followed by desorption, results in the course of line CD and similarly, partial desorption to point E followed by adsorption, results in the course shown by dotted line EF.

At 73°, 24 hours, Nylon 6 materials show a moisture range between 5–9.5% which is substantially similar to the paper products of FIG. 1 and Table 1. Particularly, Nylon 6 Extruded has a moisture content of 9.5°%. Nylon 6 Biaxially Oriented has a moisture content of 5–6%. Nylon 6 Uniaxially Oriented also has a moisture content of 5–6%. By comparison, Oriented Polypropylene has a moisture content of less than 0.005% under similar conditions. Polyethylene Terephthalates (PET) has a moisture content of 0.8% under similar conditions.

Some cellulosic films will absorb moisture similar to paper. However, these materials can have the problem of lack of heat stability to be used as a thermal film and some absorb so much moisture that a resultant curl would be oriented the other way.

It has been found that by using a nylon for the laminating material, curling is reduced. In particular, Nylon 6 either extruded, biaxially oriented, or uniaxially oriented as the laminate provides this advantage. Preferably, 0.6 mil biaxially oriented Nylon 6 is used.

FIG. 2 and Table 2 describe some of the properties of biaxially oriented Nylon which demonstrates its moisture absorbing properties similar to the paper materials described in FIG. 1 and Table 1.

Although the present invention has been described with reference to a specific embodiment, those of skill in the art will recognize that changes may be made thereto without departing from the scope and spirit of the invention as set forth in the appended claims.

providing a length of flexible paper material to be used as a soft cover for said stack of pages, said flexible paper material being of a thickness which is susceptible to moisture induced corner curl; and applying onto only one side of the length of the paper material a coextensive nylon film; the nylon film having substantially equivalent ambient moisture absorption, measured as a percentage moisture content, as the flexible paper material to prevent moisture induced corner curl.

2. The method of claim 1, wherein the nylon film and paper are rolled together.

3. The method of claim 2, wherein the nylon film is heated.

4. The method of claim 1, wherein the nylon is Nylon 6.

5. The method of claim 4, wherein the nylon film comprises Nylon 6 biaxially oriented.

6. A one sided lamination for a flexible soft cover for a soft cover book having at least one free corner, consisting essentially of:

a flexible, thin paper layer forming a cover to the book and being of a thickness which causes the paper layer to be susceptible to corner curl;

TABLE 2

PROPERTIES OF NYLON, ORIENTED

| Properties | Test Method | Typical Value #1200 (48 G) | #1500 (60 G) |
|---|---|---|---|
| Density g/cm$^3$ | ASTM D1505-68 68° F. (20° C.) | 1.15–1.16 | |
| Melting point °F. (°C.) | ASTM D2117-64 | 419–437 (215–225) | |
| Service temperature °F. (°C.) | ASTM D759-68 | −76–266 (−60–130) | |
| Tensile strength psi (kg/cm$^3$) | ASTM D882-67 68° F. (20° C.) 65% RH | $2.8 \times 10^4$–$3.6 \times 10^4$ ($2.0 \times 10^3$–$2.5 \times 10^3$) | |
| Elongation % | ASTM D882-67 68° F. (20° C.) 65% RH | 70–110 | |
| Tensile modulus psi (kg/cm$^3$) | ASTM D882-67 68° F. (20° C.) 65% RH | $2.0 \times 10^3$–$3.1 \times 10^3$ ($1.4 \times 10^4$–$2.2 \times 10^4$) | |
| Tearing strength g | ASTM D1004-66 68° F. (20° C.) 65% RH | 70–200 | 200–400 |
| Tearing strength propagated g | ASTM D1922-67 68° F. (20° C.) 65% RH | 7–10 | 10–12 |
| Shrinkage % | for 5 min. in an air circulating oven at 320° F. (160° C.) | less than 2.5 | |
| Water absorption % | ASTM D570-63 68° F. (20° C.) | 7–9 | |
| Water vapor permeability g/100 sq. in/24 hrs. (g/m$^3$/24 hrs.) | ASTM E96-66 104° F. (40° C.) 90% RH | 17–19 (260–290) | 16–17 (250–270) |
| Gas permeability O$_2$ cc/100 sq. in/24 hrs. /atm (cc/m$^3$/24 hrs./atm) | ASTM D1434-66 77° F. (25° C.) dry | 3.5–4.8 (55–75) | 2.6–3.9 (40–60) |
| Transparency % | ASTM D1746-62T 68° F. (20° C.) 65% RH | 87–90 | |
| Dielectric constant | ASTM D150-68 68° F. (20° C.) dry | 3.4 (1 kHz) | 3.0 (1 MHz) |
| Dissipation factor | ASTM D150-68 68° F. (20° C.) dry | 0.022 (1 kHz) | 0.036 (1 MHz) |
| Volume resistivity Ω-cm | ASTM D257-66 68° F. (20° C.) dry | $5 \times 10^{15}$ | |

PROPERTIES OF LAMINATED NYLON, ORIENTED NYLON

| Properties | Test Conclusions | | | 68 F. (20 C.) 65% RH |
|---|---|---|---|---|
| | EMBLEM 25μ PE 50μ | EMBLEM 15μ PE 50μ | Polyester 12μ PF 50μ | Polymer-coated Cellophane #300 PE 50μ |
| Tensile strength lb/inch width | 31.0 | 18.1 | 16.6 | 13.8 |
| ASTM D882-67 (kg/15 mm width) | (826) | (482) | (413) | (369) |

I claim as my invention:

1. A method for manufacturing a soft cover book comprising the steps of:

providing a stack of pages;

a coextensive clear nylon film layer covering said paper layer, said nylon film layer having substantially the same ambient moisture absorption, measured as a percentage moisture content as the flexible, thin paper layer.

7. The lamination of claim 6, wherein the nylon layer comprises Nylon 6.

8. The lamination of claim 6, wherein the nylon layer comprises Nylon 6 biaxially oriented.

9. A method for one side thermally laminating a sheet of paper for a flexible soft cover for a soft cover book having at least one free corner, comprising:

providing a length of flexible paper to be used as a flexible soft cover for a book said flexible paper being of a thickness which causes the paper to be susceptible to corner curl; and thermally laminating onto one side of the length of paper a nylon film comprising a material having a composition with the capacity to absorb moisture in the range between 5 and 9.5% moisture content at typical room temperature, to prevent corner curl of said soft cover.

10. The method of claim 9, wherein the paper and film are rolled together.

11. The method of claim 10, wherein the film is heated.

12. A method for preventing curl in a one sided thermal lamination for a flexible soft cover for a soft cover book having at least one free corner, comprising the steps of:

providing a flexible paper sheet to act as a flexible soft cover to be laminated, the paper sheet being of a thickness which causes the paper to be susceptible to corner curl;

laminating a nylon film onto said sheet, using heat and pressure, said film selected to comprise substantially the same rate of elongation in the presence of humidity as said sheet to prevent corner curl by moisture absorption.

13. The method of claim 12, wherein said film and said sheet have substantially equivalent moisture absorbing potential.

14. The method of claim 12, wherein said film and said sheet have moisture content potential of between 1 and 10%.

* * * * *